United States Patent
Herrington et al.

(10) Patent No.: US 9,971,948 B1
(45) Date of Patent: May 15, 2018

(54) VEIN IMAGING USING DETECTION OF PULSED RADIATION

(71) Applicant: Apple Inc., Cupertino, CA (US)

(72) Inventors: Andrew T. Herrington, San Francisco, CA (US); Jawad Nawasra, San Francisco, CA (US); Scott T. Smith, San Jose, CA (US)

(73) Assignee: APPLE INC., Cupertino, CA (US)

( * ) Notice: Subject to any disclaimer, the term of this patent is extended or adjusted under 35 U.S.C. 154(b) by 196 days.

(21) Appl. No.: 14/938,857

(22) Filed: Nov. 12, 2015

(51) Int. Cl.
   *G06K 9/00* (2006.01)
   *H04N 5/33* (2006.01)
   *G06F 21/32* (2013.01)

(52) U.S. Cl.
   CPC ......... *G06K 9/00885* (2013.01); *G06F 21/32* (2013.01); *H04N 5/33* (2013.01); *G06K 2009/00932* (2013.01)

(58) Field of Classification Search
   CPC ...... G06K 9/00885; G06K 2009/00932; G06F 21/32; H04N 5/33
   USPC ....................................................... 382/115
   See application file for complete search history.

(56) References Cited

U.S. PATENT DOCUMENTS

| | | | | |
|---|---|---|---|---|
| 4,608,599 A | * | 8/1986 | Kaneko | H04N 5/33 348/164 |
| 8,493,496 B2 | * | 7/2013 | Freedman | G01B 11/25 345/32 |
| 2013/0207970 A1 | | 8/2013 | Shpunt et al. | |
| 2015/0261946 A1 | * | 9/2015 | Yoon | G06F 21/34 726/19 |

FOREIGN PATENT DOCUMENTS

KR 20080065126 A * 7/2008 ......... G01B 9/02004

OTHER PUBLICATIONS

Jawad et al., U.S. Appl. No. 14/698,912, filed Apr. 29, 2015.

* cited by examiner

*Primary Examiner* — Amandeep Saini
(74) *Attorney, Agent, or Firm* — D. Kligler IP Services Ltd.

(57) ABSTRACT

Imaging apparatus includes an image capture device, which includes an optical transmitter, which is configured to emit one or more pulses of infrared radiation toward an area containing a body surface of a living subject, and an optical receiver, which is configured to receive the pulses reflected from the body surface and to generate an output indicative of a modulation of the pulses by tissue below the body surface. A processor is configured to generate, based on the modulation of the pulses, an image of blood vessels located beneath the body surface within the area.

18 Claims, 2 Drawing Sheets

VEIN IMAGING USING DETECTION OF PULSED RADIATION

FIELD OF THE INVENTION

The present invention relates generally to methods and systems for imaging, and particularly to image-based identification techniques.

BACKGROUND

Biometric identification systems detect and authenticate the identity of a human subject on the basis of unique physiological features, such as fingerprints. Some techniques for biometric identification use vein patterns in the hands or other parts of the body. Vein identification systems that are known in the art transmit infrared illumination through the user's hand, and capture a resulting image in which the veins within the hand appear as dark or bright lines due to variations in the captured infrared intensity. Hand vein authentication is considered to have a high level of authentication accuracy due to the complexity of the vein patterns in the hand. Because the vein patterns are internal to the body, they are difficult to counterfeit. Furthermore, vein imaging is contactless and therefore alleviates hygienic concerns that are associated with common systems that use fingerprints or handprints.

SUMMARY

Embodiments of the present invention that are described hereinbelow provide improved methods and apparatus for imaging of blood vessel patterns below the skin of a human subject.

There is therefore provided, in accordance with an embodiment of the invention, imaging apparatus, including an image capture device, which includes an optical transmitter, which is configured to emit one or more pulses of infrared radiation toward an area containing a body surface of a living subject, and an optical receiver, which is configured to receive the one or more pulses reflected from the body surface and to generate an output indicative of a modulation of the pulses by tissue below the body surface. A processor is configured to generate, based on the modulation of the one or more pulses, an image of blood vessels located beneath the body surface within the area.

In a disclosed embodiment, the image capture device includes scanning optics, which are configured to scan a sequence of the pulses over the area.

In some embodiments, the optical transmitter includes a laser. Typically, the pulses emitted by the laser have a duration less than 10 ns, and possibly less than 2 ns. In a disclosed embodiment, the infrared radiation emitted by the laser is in a band having a center wavelength greater than 900 nm.

In a disclosed embodiment, the output of the optical receiver is indicative of a shift in a phase of the received pulses.

In some embodiments, the processor is configured to compare the image to a stored map of the blood vessels in order to authenticate an identity of the living subject. Additionally or alternatively, the processor is further configured to generate, based on a time of flight of the pulses, a three-dimensional map of the body surface.

There is also provided, in accordance with an embodiment of the invention, a method for imaging, which includes illuminating an area containing a body surface of a living subject with one or more pulses of infrared radiation, receiving the one or more pulses reflected from the body surface and generating an output, in response to the received pulses, that is indicative of a modulation of the pulses by tissue below the body surface. Based on the modulation of the one or more pulses, an image is generated of blood vessels located beneath the body surface within the area.

The present invention will be more fully understood from the following detailed description of the embodiments thereof, taken together with the drawings in which:

DETAILED DESCRIPTION OF EMBODIMENTS

Figure 1:
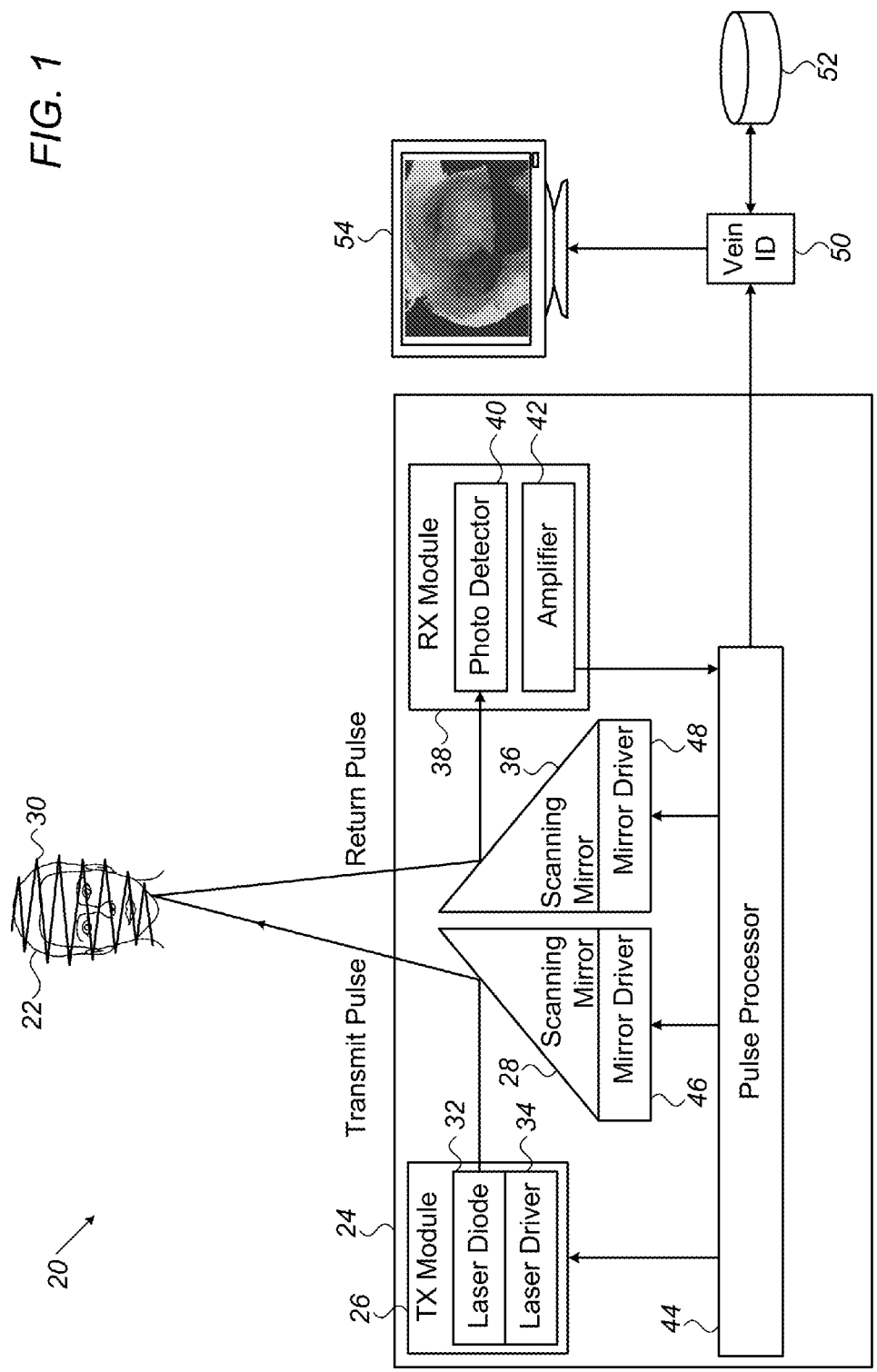
FIG. 1 is block diagram that schematically illustrates a system for image-based identification, in accordance with an embodiment of the invention.

The field of image-based face detection and analysis has advanced rapidly over recent years and is widely used in identification and authentication applications. A complex pattern of blood vessels runs close beneath the skin of the face, and detection of this pattern under infrared illumination could be used, for example, to enhance the reliability of facial authentication. In investigating this technique, however, the inventors have found that specular reflection of the infrared rays from the most useful areas of the face, such as the forehead, tends to mask and severely reduce the contrast of the blood vessel image, particularly when the skin is moist or oily.

On the other hand, the inventors have discovered that when the skin is illuminated with very short pulses of infrared radiation, it is possible to detect a marked difference in the modulation of the pulses by the blood in subcutaneous vessels and the surrounding tissue. The term "modulation" in this context refers to a change in the temporal shape and/or a phase shift of the reflected pulses, and not only the pulse amplitude. This effect is particularly marked at wavelengths greater than 900 nm, where hemoglobin absorption grows stronger, and can best be observed using pulse durations less than 10 ns, and in particular less than 2 ns. Illumination and detection of very short infrared pulses can thus be used to obtain images of the subcutaneous vasculature with much higher contrast than conventional imaging methods.

Some embodiments of the present invention provide imaging devices and systems that take advantage of these principles. In the disclosed embodiments, an optical transmitter, such as a laser, emits a pulse or sequence of pulses of infrared radiation toward an area containing a body surface of a living subject, such as the skin of the subject's face. An optical receiver, such as a high-speed infrared detector or array of such detectors, receives the pulses reflected from the body surface and generates an output that is indicative of a modulation of the pulses by tissue below the body surface. Based on the detected modulation as a function of location on the body surface, a processor generates an image of the blood vessels that are located beneath the body surface within the area of the image.

In the disclosed embodiments, the imaging device comprises scanning optics, which scan the infrared pulses over the area, so that the receiver sequentially detects the modulation at each location during the scan. Alternatively, the principles of the present invention may be implemented in staring configurations, in which the infrared pulses illuminate the entire image area, and the reflected radiation is detected by a suitable array of time-sensitive detectors, such as a single-photon avalanche diode (SPAD) array.

The image of the blood vessels may be compared to a stored map of the blood vessels in order to authenticate the identity of the subject of the image. Additionally or alternatively, the output of the optical receiver may be processed to extract a time of flight of the received pulses as a function of location, and the processor may generate, based on the time of flight, a three-dimensional (3D) map of the body surface. The 3D map may be combined with the image of the blood vessels for enhanced reliability of identification, as well as for other purposes.

FIG. 1 is a block diagram that schematically illustrates a system 20 for image-based identification, in accordance with an embodiment of the invention. System 20 creates an image of blood vessels located beneath the body surface of a living subject 22, using an image capture device 24 that transmits and receives pulses of infrared radiation to and from the subject. Device 24 in this embodiment is also capable of measuring the time of flight of the pulses and to generate, on this basis, a 3D map of the body surface of subject 22. Further details of 3D mapping systems of this sort are described, for example, in U.S. patent application Ser. No. 14/698,912, filed Apr. 29, 2015, and in U.S. Patent Application Publication 2013/0207970. The disclosures of both of these patent applications are incorporated herein by reference. System 20 may also comprise an auxiliary camera (not shown), which captures 2D color images of subject 22.

Imaging device 24 comprises an optical transmitter module 26, which emits one or more pulses of infrared radiation along a transmit path toward subject 22. In the pictured example, which uses optical scanning, module 26 comprises a laser diode 32, which is controlled by a laser driver circuit 34 to emit a train of short pulses of infrared radiation. Laser diode 32 operates at a wavelength longer than 900 nm and emits pulses whose duration (full width at half maximum) is less than 10 ns, and typically less than 2 ns. The inventors found, for example, that a laser diode operating in a band centered at 940 nm, with pulses whose duration was about 1.25 ns, gave good results in producing images of blood vessels using the techniques described herein.

The pulses emitted by transmitter module 26 are reflected from a first scanning mirror 28, which is controlled by a mirror driver circuit 46 to scan the pulses along a pattern 30 covering an area containing at least a part of the body surface of subject 22. Pattern 30 may comprise a raster pattern or any other suitable sort of scan pattern, and the scanned area may be rectangular or non-rectangular. (For example, the scan area may fit the area of the face of subject 22, as determined based on a 3D map and/or 2D image of the scene containing the subject.)

A second scanning mirror 36 directs the pulses reflected from subject 22 along a return path, separated from the transmit path, toward a receiver module 38. Mirror 36 is controlled by a mirror driver circuit 48 to scan in synchronization with mirror 28. Alternatively, a single scanning mirror or mirror array (not shown in the figures) may be used on both the transmit and return paths. In addition to mirrors 28 and 36, imaging device typically comprises further optical elements for collimating, collecting, and filtering the optical pulses, as will be apparent to those skilled in the art, but these elements are omitted from the figures for the sake of simplicity.

Receiver module 38 receives the infrared pulses reflected from the scene and generates an output that is indicative of the modulation of the pulses. For this purpose, in the present embodiment, module 38 comprises a high-speed photodetector 40, such as an avalanche photodiode, coupled to a suitable amplifier 42. These elements generate a train of electrical pulses whose amplitude, shape and phase are indicative of the modulation of the infrared pulses reflected from subject 22. A pulse processor 44 comprises logic circuits that process this train of electrical pulses, as mirrors 28 and 36 scan over the area of subject 22, so as to generate, based on the modulation of the pulses, an image of the blood vessels located beneath the body surface within the scan area. In addition, the delay of the pulses output by receiver module 38, relative to the pulses that drive transmitter module 26, is indicative of the time of flight of the pulses and can be used by pulse processor 44 in generating a 3D map of subject 22, as noted above. For these purposes, pulse processor 44 may, for example, apply a matched filter designed to fit the expected pulse shape.

Figure 2:
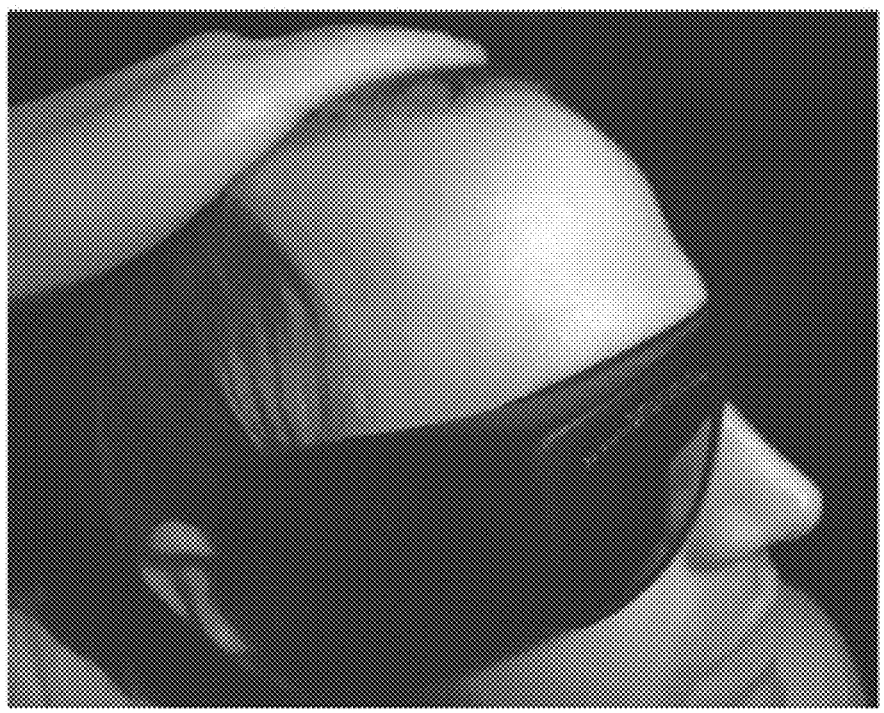
FIG. 2 is an image of a human subject acquired using an infrared imaging technique that is known in the art.
Figure 3:
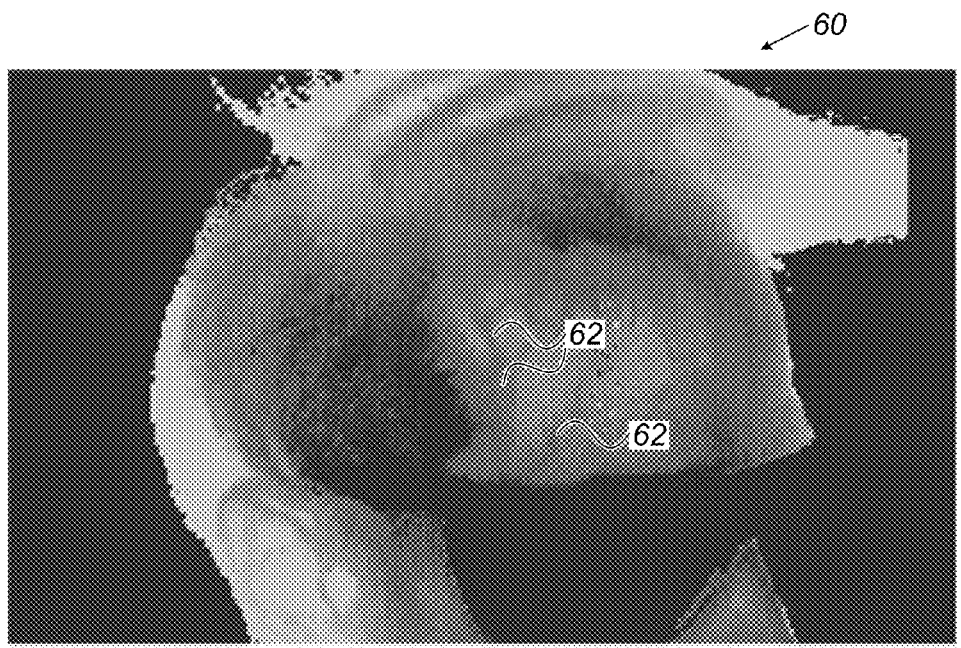
FIG. 3 is an image of a human subject showing subcutaneous veins, acquired by a pulsed imaging technique in accordance with an embodiment of the invention.

Reference is now made to FIGS. 2 and 3, which schematically show and compare two infrared images of the head of a human subject, both using illumination at 940 nm. FIG. 2 is an image acquired using conventional infrared flood illumination, whereas FIG. 3 was acquired by a pulsed imaging technique in accordance with an embodiment of the invention, such as the technique implemented in image capture device 24 and described above. As can be seen in FIG. 2, specular reflection due to oil on the surface of the forehead washes out the contrast of the subcutaneous veins under flood illumination. In FIG. 3, however, the ability of image capture device 24 to detect modulation of the short infrared pulses enables the device to form an image 60 in which subcutaneous veins 62 are clearly visible.

Returning now to FIG. 1, image capture device 24 outputs image 60 to a vein identification processor 50, which typically comprises a general-purpose computer with suitable image processing and pattern matching software. Alternatively, the functions of vein identification processor 50 may be integrated into pulse processor 44. In either case, the processor compares image 60 to a previously-acquired map of the blood vessels, stored in a memory 52, in order to authenticate the identity of subject 22. Additionally or alternatively, processor 50 may present image 60 on a display 54 for purposes of visual assessment.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Imaging apparatus, comprising:
    an image capture device, which comprises:
        an optical transmitter, which is configured to emit one or more pulses of infrared radiation toward an area containing a body surface of a living subject; and
        an optical receiver, which is configured to receive the one or more pulses reflected from the body surface and to generate an output indicative of a modulation of the pulses by tissue below the body surface; and a processor, which is configured to generate, based on the modulation of the one or more pulses, an image of blood vessels located beneath the body surface within the area.

2. The apparatus according to claim 1, wherein the image capture device comprises scanning optics, which are configured to scan a sequence of the pulses over the area.

3. The apparatus according to claim 1, wherein the optical transmitter comprises a laser.

4. The apparatus according to claim 3, wherein the pulses emitted by the laser have a duration less than 10 ns.

5. The apparatus according to claim 4, wherein the duration of the pulses is less than 2 ns.

6. The apparatus according to claim 3, wherein the infrared radiation emitted by the laser is in a band having a center wavelength greater than 900 nm.

7. The apparatus according to claim 1, wherein the output of the optical receiver is indicative of a shift in a phase of the received pulses.

8. The apparatus according to claim 1, wherein the processor is configured to compare the image to a stored map of the blood vessels in order to authenticate an identity of the living subject.

9. The apparatus according to claim 1, wherein the processor is further configured to generate, based on a time of flight of the pulses, a three-dimensional map of the body surface.

10. A method for imaging, comprising:
   illuminating an area containing a body surface of a living subject with one or more pulses of infrared radiation;
   receiving the one or more pulses reflected from the body surface and generating an output, in response to the received pulses, that is indicative of a modulation of the pulses by tissue below the body surface; and
   generating, based on the modulation of the one or more pulses, an image of blood vessels located beneath the body surface within the area.

11. The method according to claim 10, wherein illuminating the area comprises scanning a sequence of the pulses over the area.

12. The method according to claim 10, wherein the pulses of the infrared radiation are emitted by a laser.

13. The method according to claim 12, wherein the pulses emitted by the laser have a duration less than 10 ns.

14. The method according to claim 13, wherein the duration of the pulses is less than 2 ns.

15. The method according to claim 12, wherein the infrared radiation emitted by the laser is in a band having a center wavelength greater than 900 nm.

16. The method according to claim 10, wherein the output generated is indicative of a shift in a phase of the received pulses.

17. The method according to claim 10, and comprising comparing the image to a stored map of the blood vessels in order to authenticate an identity of the living subject.

18. The method according to claim 10, and comprising generating, based on a time of flight of the pulses, a three-dimensional map of the body surface.

* * * * *